United States Patent
An et al.

(10) Patent No.: US 10,985,786 B2
(45) Date of Patent: Apr. 20, 2021

(54) METHOD FOR MULTIBAND COMMUNICATION USING SINGLE ANTENNA AND ELECTRONIC DEVICE THEREFOR

(71) Applicant: Samsung Electronics Co., Ltd., Gyeonggi-do (KR)

(72) Inventors: Yongjun An, Gyeonggi-do (KR); Hyoseok Na, Gyeonggi-do (KR)

(73) Assignee: Samsung Electronics Co., Ltd.

( * ) Notice: Subject to any disclaimer, the term of this patent is extended or adjusted under 35 U.S.C. 154(b) by 0 days.

(21) Appl. No.: 16/875,510

(22) Filed: May 15, 2020

(65) Prior Publication Data
US 2020/0366320 A1    Nov. 19, 2020

(30) Foreign Application Priority Data
May 15, 2019   (KR) .................. 10-2019-0056774

(51) Int. Cl.
*H04B 1/40*    (2015.01)
*H04B 1/00*    (2006.01)
(Continued)

(52) U.S. Cl.
CPC ........... *H04B 1/006* (2013.01); *H04B 1/0057* (2013.01); *H04B 1/406* (2013.01); *H04B 1/44* (2013.01)

(58) Field of Classification Search
CPC ........ H04B 1/0057; H04B 1/006; H04B 1/04; H04B 1/16; H04B 1/18; H04B 1/44;
(Continued)

(56) References Cited

U.S. PATENT DOCUMENTS

| 7,313,367 B2 | 12/2007 | Bialek et al. |
| 9,240,811 B2 | 1/2016 | Norholm et al. |

(Continued)

FOREIGN PATENT DOCUMENTS

| JP | 2015-046913 | 3/2015 |
| KR | 1020160058193 | 5/2016 |
| WO | WO 2017/019245 | 2/2017 |

OTHER PUBLICATIONS

International Search Report dated Aug. 26, 2020 issued in counterpart application No. PCT/KR2020/006415, 8 pages.

*Primary Examiner* — Quochien B Vuong
(74) *Attorney, Agent, or Firm* — The Farrell Law Firm, P.C.

(57) ABSTRACT

Disclosed is an electronic device that performs communication in multiple bands by using a single antenna, and includes an antenna, a radio frequency front end module (RF FEM) connected to the antenna, a first signal processing module connected to the RF FEM and configured to process a signal of a first radio access technology (RAT), and a second signal processing module connected to the RF FEM and configured to process a signal of a second RAT, the signal of the second RAT being different than the signal of the first RAT, and the RF FEM including a frequency separating circuit configured to separate a signal received through the antenna into the signal of the first RAT and the signal of the second RAT, and a switch including a first input terminal coupled with the antenna, a first output terminal coupled with an input terminal of the frequency separating circuit, a second input terminal coupled with one of output terminals of the frequency separating circuit, and a second output terminal coupled with a path for the first signal processing module.

20 Claims, 12 Drawing Sheets

(51) Int. Cl.
*H04B 1/403* (2015.01)
*H04B 1/44* (2006.01)

(58) Field of Classification Search
CPC ...... H04B 1/406; H04W 48/18; H04W 88/02; H04W 88/06
See application file for complete search history.

(56) References Cited

U.S. PATENT DOCUMENTS

| | | |
|---|---|---|
| 9,288,031 B2 * | 3/2016 | Rousu ...................... H04B 1/40 |
| 9,326,320 B2 * | 4/2016 | Hong ...................... H04B 1/006 |
| 10,334,601 B2 * | 6/2019 | Chen ................... H04W 72/048 |
| 10,375,754 B2 * | 8/2019 | Lan ...................... H04B 1/0064 |
| 2012/0243449 A1 | 9/2012 | He |
| 2017/0141467 A1 | 5/2017 | Dupuy et al. |
| 2018/0294547 A1 | 10/2018 | Park et al. |
| 2018/0367173 A1 | 12/2018 | King et al. |

* cited by examiner

METHOD FOR MULTIBAND COMMUNICATION USING SINGLE ANTENNA AND ELECTRONIC DEVICE THEREFOR

CROSS-REFERENCE TO RELATED APPLICATION(S)

This application is based on and claims priority under 35 U.S.C. § 119 to Korean Patent Application No. 10-2019-0056774, filed on May 15, 2019, in the Korean Intellectual Property Office, the disclosure of which is incorporated herein by reference in its entirety.

BACKGROUND

1. Field

The disclosure relates generally to an electronic device and, more particularly, to a method for performing communication in multiple bands by using a single antenna, and an electronic device therefor.

2. Description of Related Art

As the performance of an electronic device, such as a smart phone, has vastly improved and the demands of users for various services have increased, an electronic device has evolved to be able to support a plurality of radio access technologies (RATs). For example, an electronic device may support a cellular communication, such as long term evolution (LTE), and a near field communication, such as a wireless local area network (WLAN), Bluetooth™, or an ultra-wide band (UWB) as well as a traditional voice call. As an electronic device supports various RATs, a user may use at least one RAT suitable for a given environment and service, and the ability to transmit and/or receive a signal in many frequency bands may be required.

In order to cover many frequency bands and obtain a communication gain, the number of antennas installed in an electronic device may be increased. Due to a spatial constraint, it is exceedingly difficult to install a number of antennas equal to the number of frequency bands, and thus, a situation where one antenna should support multiple bands may occur. Some of the multiple bands may be adjacent to each other or overlap each other in a frequency axis, which tends to cause performance deterioration between the bands. Even if a frequency separating circuit is used, such as a filter, the loss of a signal in another band may occur due to the frequency separating circuit.

Accordingly, there is a need in the art for a method and apparatus that mitigates such performance deterioration and signal loss in a multi-band antenna for the electronic device.

SUMMARY

Aspects of the disclosure are to address at least the above-mentioned problems and/or disadvantages and to provide at least the advantages described below. Accordingly, an aspect of the disclosure is to provide a method and electronic device for performing control such that a frequency separating circuit coupled to a single antenna supporting multiple bands is selectively included on a reception path.

In accordance with an aspect of the disclosure, an electronic device may include an antenna, a radio frequency front end module (RF FEM) connected to the antenna, a first signal processing module connected to the RF FEM and configured to process a signal of a first RAT, and a second signal processing module connected to the RF FEM and configured to process a signal of a second RAT, the signal of the second RAT being different than the signal of the first RAT, and the RF FEM including a frequency separating circuit configured to separate a signal received through the antenna into the signal of the first RAT and the signal of the second RAT, and a switch including a first input terminal coupled with the antenna, a first output terminal coupled with an input terminal of the frequency separating circuit, a second input terminal coupled with one of output terminals of the frequency separating circuit, and a second output terminal coupled with a path for the first signal processing module.

In accordance with another aspect of the disclosure, an operation method of an electronic device, including connecting a first input terminal, which is coupled with an antenna, of a switch to a first output terminal, which is coupled with an input terminal of a frequency separating circuit of the switch when a first RAT and a second RAT are activated, providing an RF path coupled with a first signal processing module for the first RAT with a first RAT signal separated, by the frequency separating circuit, from a signal received through the antenna, through a second input terminal and a second output terminal of the switch, and providing a second signal processing module for the second RAT with a second RAT signal separated, by the frequency separating circuit, from a signal received through the antenna.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
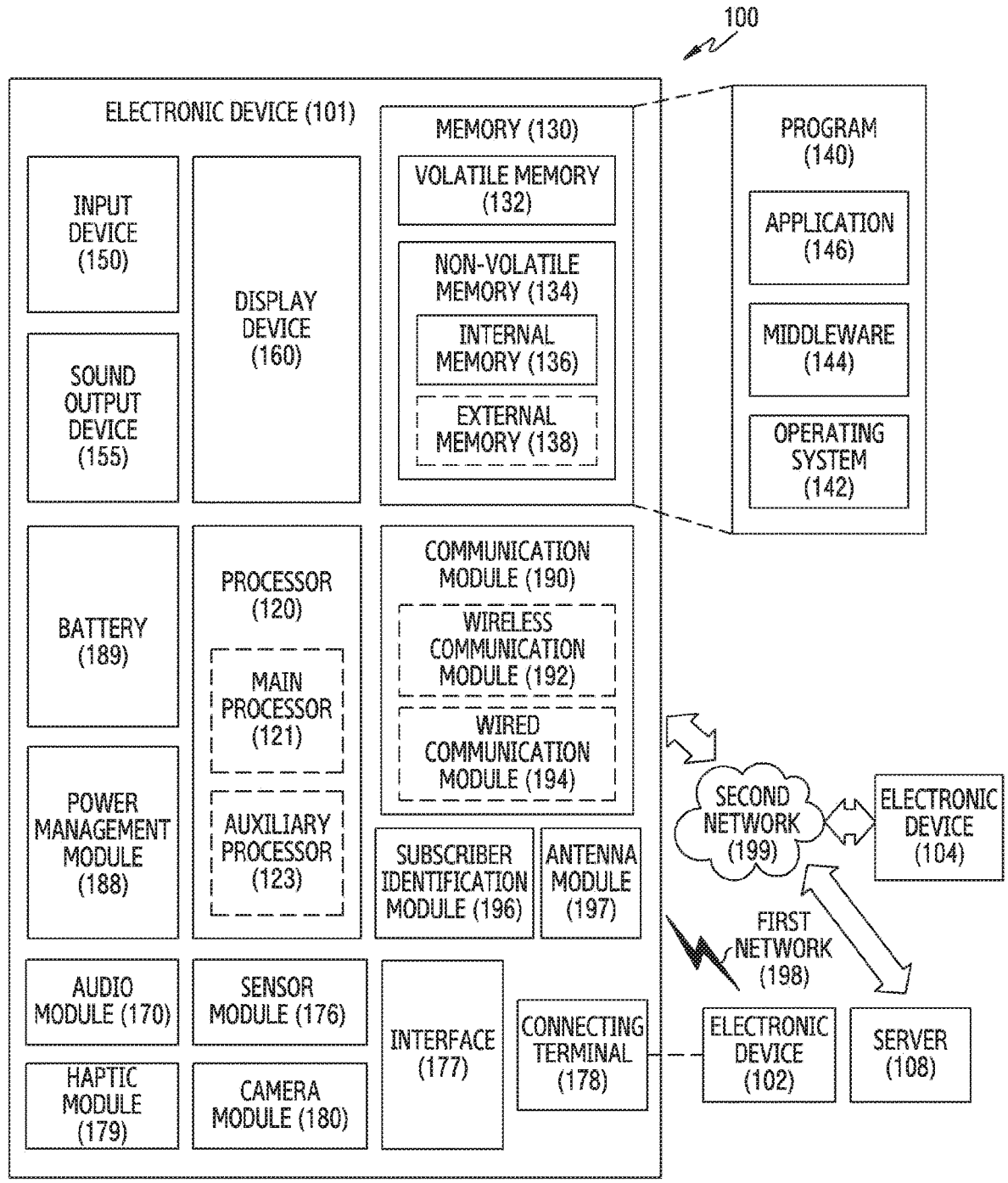
FIG. 1 is a block diagram of an electronic device in a network environment according to an embodiment.

Hereinafter, embodiments of the disclosure will be described in detail with reference to accompanying drawings. In the disclosure, embodiments are described in the drawings and a related detailed description is set forth, but this is not intended to limit the embodiments of the disclosure. Descriptions of well-known functions and constructions are omitted for the sake of clarity and conciseness.

The electronic device herein may be one of various types of electronic devices, such as a portable communication device (e.g., a smartphone), a computer device, a portable multimedia device, a portable medical device, a camera, a wearable device, or a home appliance. However, the electronic devices are not limited to those described above.

It should be appreciated that embodiments of the disclosure and the terms used therein are not intended to limit the technological features set forth herein to particular embodiments and include various changes, equivalents, or replacements for a corresponding embodiment.

With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and do not limit the components in importance or order. It is to be understood that if an element (e.g., a first element) is referred to, with or without the term "operatively" or "communicatively", as "coupled with," "coupled to," "connected with," or "connected to" another element (e.g., a second element), this indicates that the first element may be coupled with the second element directly (e.g., wiredly), wirelessly, or via a third element.

FIG. 1 is a block diagram illustrating an electronic device 101 in a network environment 100 according to an embodiment. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) card 196, and an antenna module 197. At least one of the components may be omitted from the electronic device 101, or one or more other components may be added in the electronic device 101. Some of the components may be implemented as single integrated circuitry. For example, the sensor module 176 (e.g., a fingerprint sensor, an iris sensor, or an illuminance sensor) may be implemented as embedded in the display device 160.

The processor 120 may execute a program 140 to control at least one other component (e.g., a hardware or software component) of the electronic device 101 coupled with the processor 120, and may perform various data processing or computation. As at least part of the data processing or computation, the processor 120 may load a command or data received from another component in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component functionally related to the auxiliary processor 123.

The memory 130 may store various data used by at least one component of the electronic device 101. The various data may include the program 140 and input data or output data for a command related thereto. The memory 130 may include the volatile memory 132 or the non-volatile memory 134.

The program 140 may be stored in the memory 130 as software, and may include an operating system (OS) 142, middleware 144, or an application 146.

The input device 150 may receive a command or data to be used by other component of the electronic device 101, from the outside (e.g., a user) of the electronic device 101. The input device 150 may include a microphone, a mouse, a keyboard, or a digital pen (e.g., a stylus pen).

The sound output device 155 may output sound signals to the outside of the electronic device 101. The sound output device 155 may include a speaker or a receiver. The speaker may be used for general purposes, such as playing multimedia or playing record, and the receiver may be used for an incoming calls. The receiver may be implemented as separate from, or as part of the speaker.

The display device 160 may visually provide information to the outside (e.g., a user) of the electronic device 101. The display device 160 may include a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the sound output device 155 or a headphone of an external electronic device 102 directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device 102 directly (e.g., wiredly) or wirelessly. The interface 177 may include a high definition multimedia interface (HDMI), a universal serial bus (USB) interface, a secure digital (SD) card interface, or an audio interface.

A connecting terminal 178 may include a connector via which the electronic device 101 may be physically connected with the external electronic device 102. The connecting terminal 178 may include a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include a motor, a piezoelectric element, or an electric stimulator.

The camera module 180 may capture a still image or moving images. The camera module 180 may include one or more lenses, image sensors, ISPs, or flashes.

The power management module 188 may manage power supplied to the electronic device 101. The power management module 188 may be implemented as at least part of a power management integrated circuit (PMIC).

The battery 189 may supply power to at least one component of the electronic device 101. The battery 189 may include a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module).

A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM card 196.

The antenna module 197 may transmit or receive a signal or power to or from the external electronic device of the electronic device 101. The antenna module 197 may include an antenna including a radiating element composed of a conductive material or a conductive pattern formed in or on a substrate (e.g., a printed circuit board (PCB)). The antenna module 197 may include a plurality of antennas, in which case at least one antenna appropriate for a communication scheme used in the communication network, such as the first network 198 or the second network 199, may be selected by the wireless communication module 192 from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 and 104 may be a device of a same type as, or a different type, from the electronic device 101.

All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud, distributed, or client-server computing technology may be used, for example.

In FIG. 1, the antenna module 197 may include one antenna including a conductor disposed on the PCB or a radiator configured by a conductive pattern. The antenna module 197 may be configured in a shape of a metal bezel.

In FIG. 1, the communication module 190 of the electronic device 101 may support a plurality of RATs that are divided into a cellular technology and a connectivity technology. The cellular technology may include a cellular communication such as long term evolution (LTE), LET-advanced (LTE-A), or 5th generation (5G) new radio (NR), and the connectivity technology may include a near field communication such as a wireless local area network (WLAN), Bluetooth™, an ultra-wide band (UWB), or a global positioning system (GPS).

In order to support the plurality of RATs, a plurality of antennas may be installed within a limited space of the electronic device 101. If there is insufficient space for the installation of antennas, one antenna may be required to cover a plurality of bands for two or more RATs. Since a single antenna covers a plurality of bands, a signal received through the single antenna may be separated into signals, which belong to the bands, respectively, by means of a frequency separating circuit.

The frequency separating circuit is for dividing a signal path for each frequency so as to develop an antenna supporting a plurality of bands or process a plurality of bands by means of one part, and may be implemented as a diplexer, a triplexer, and/or a multiplexer. A frequency separating circuit for separating only a signal belonging to a specific band may be referred to as an extractor. For example, a GPS extractor for extracting a GPS signal and a Wi-Fi extractor for extracting a WLAN signal may be used.

When only a signal belonging to a specific band is separated, the loss of a signal belonging to another band may occur. For example, in a process of separating a signal for each band, if adjacent bands are required to be divided in a frequency axis, some of the bands may deteriorate or may not be used due to a characteristic of a frequency separating circuit.

Figure 2:
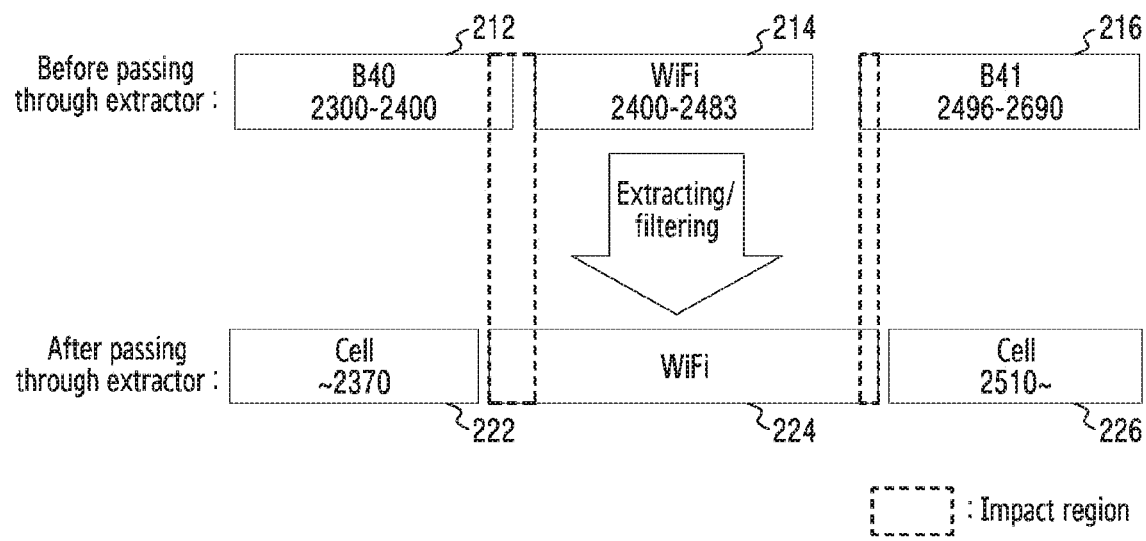
FIG. 2 illustrates bands supported by a single antenna of an electronic device according to an embodiment.

FIG. 2 illustrates bands supported by a single antenna of an electronic device according to an embodiment. Referring to FIG. 2, a cellular band B40, a Wi-Fi band, and/or a cellular band B41 are illustrated as three frequency bands. Signals 212, 214, and 216 of a band including the three frequency bands may be separated by a frequency separating circuit, such as an extractor and/or a filter. For example, as an extractor extracts a signal from a Wi-Fi band and allows signals of remaining bands to pass therethrough, the extractor may output separated signals 222, 224, and 226. In a frequency separating operation, a part of a signal may be lost due to a characteristic of an extractor. For example, the signal loss or the deterioration may occur at a boundary of the signals 212 and 216 of the cellular bands belonging to an impact region.

In FIG. 2, signals of adjacent bands may be lost by a frequency separating circuit. A degree of the signal loss may depend on a coupling structure of a frequency separating circuit and an antenna supporting a plurality of bands. Examples of a conventional coupling structure of an antenna and a frequency separating circuit are described as follows.

A coupling structure of a frequency separating circuit and an antenna supporting a plurality of bands may be variously implemented in an RF FEM. The RF FEM may include circuits (for example, a filter, a switch, and/or an amplifier) for an RF communication. The RF FEM is a part which, in one antenna, configures at least one band among a plurality of frequency bands so as to enable the communication, and for example, may process one or multiple bands at once by using a single pole multi-throw (SPNT)(or single pole N throw(SPNT)) switch. The SPNT switch includes one input terminal and a plurality of output terminals, and the one input terminal may be mapped with at least one of the plurality of output terminals. The mapping may indicate an operation of forming a path between a corresponding input terminal and a corresponding output terminal such that a signal input through the corresponding input terminal is output through the corresponding output terminal. An operation of "mapping" may also be expressed as "connect", "configure a path", or other terms having a similar meaning. The RF FEM may have one input, and may be directly coupled to an antenna or indirectly coupled to an antenna through a frequency separating circuit (for example, a diplexer, a multiplexer, and/or an extractor).

As a technology of processing a plurality of frequency bands by using an SPNT switch, direct mapping may be used. The direct mapping enables a plurality of frequency bands to be processed in an RF FEM. Output terminals of an SPNT switch may be coupled with RF paths for processing different bands, and each of the RF paths may include a matching element and/or a filter. The matching element may form an open state with respect to a band of a filter coupled with another output terminal. The impedance matching of filters of the RF paths may be achieved by the matching element. A characteristic of the matching element may be considered for the filter design. By the direct mapping, one of the plurality of bands may be selectively used, or two or more bands may be simultaneously used as needed, such as when carrier aggregation (CA) is performed. An x-poles multi-throw (XPNT) switch supporting multiple inputs may be used in place of the SPNT switch.

Figure 3A:
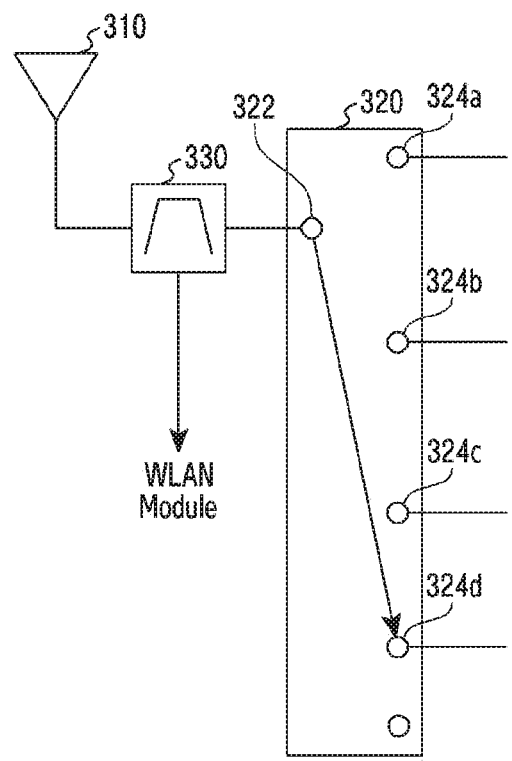
FIG. 3A illustrates a coupling structure of an antenna and a frequency separating circuit in an electronic device according to an embodiment.

FIG. 3A illustrates a coupling structure of the antenna 310 and the frequency separating circuit 330 in an electronic device according to a first embodiment. In FIG. 3A, since there is no bypass between the antenna 310 and the switch 320 except for a path passing through the frequency separating circuit 330, a reception signal may be input to the switch 320 through the frequency separating circuit 330. The reception signal always passes through the frequency separating circuit 330, and thus, even if a communication using the second RAT is not performed, the deterioration of the first RAT signal may occur.

Figure 3B:
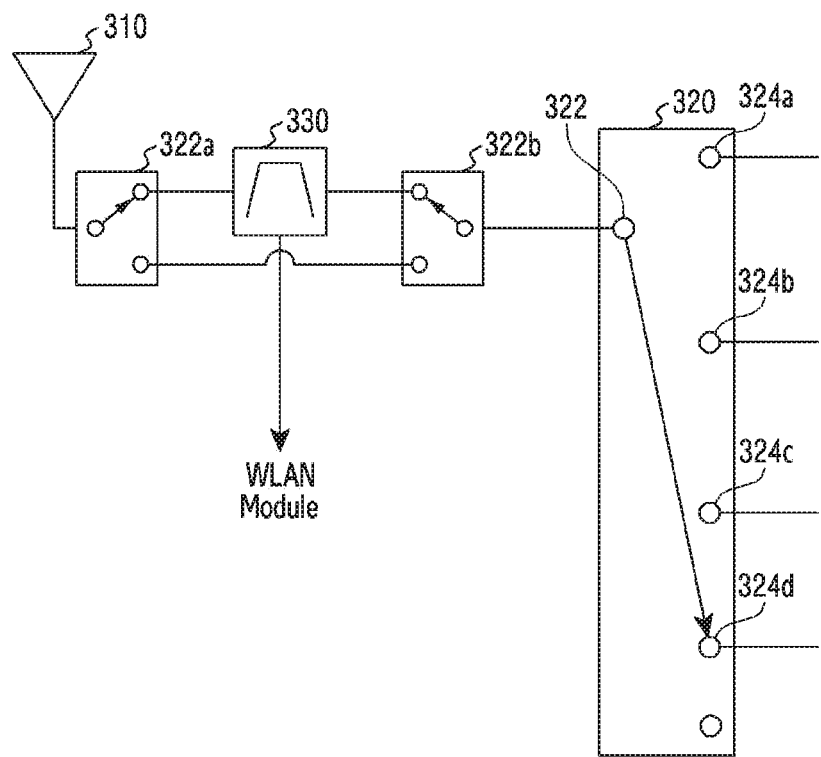
FIG. 3B illustrates a coupling structure of an antenna and a frequency separating circuit in an electronic device according to another embodiment.

FIG. 3B illustrates a coupling structure of the antenna 310 and the frequency separating circuit 330 in an electronic device according to a second embodiment. As shown in FIG. 3B, as a first switch 322a and a second switch 322b are disposed at opposite ends of the frequency separating circuit 330, a bypass between the antenna 310 and the switch 320 may be formed. When a communication using the second RAT is not performed, an electronic device may prevent the signal loss due to the frequency separating circuit 330 by forming a bypass by using the first switch 322a and the second switch 322b and transferring a signal received through the antenna 310 to the switch 320 through the bypass. A signal loss due to the frequency separating circuit 330 is prevented, but since the first switch 322a and the second switch 322b are included in the bypass, a signal loss due to the first switch 322a and the second switch 322b may occur.

The first switch 322a and the second switch 322b may affect not only the first RAT signal, but also the second RAT signal. The insertion loss (IL) of the first switch 322a and the second switch 322b is lower than the IL of the frequency separating circuit 330, but the first and second switches may adversely affect a signal in comparison to when there are no first and second switches. The signal loss due to the first switch 322a and the second switch 322b may increase as a frequency of a signal increases.

Figure 3C:
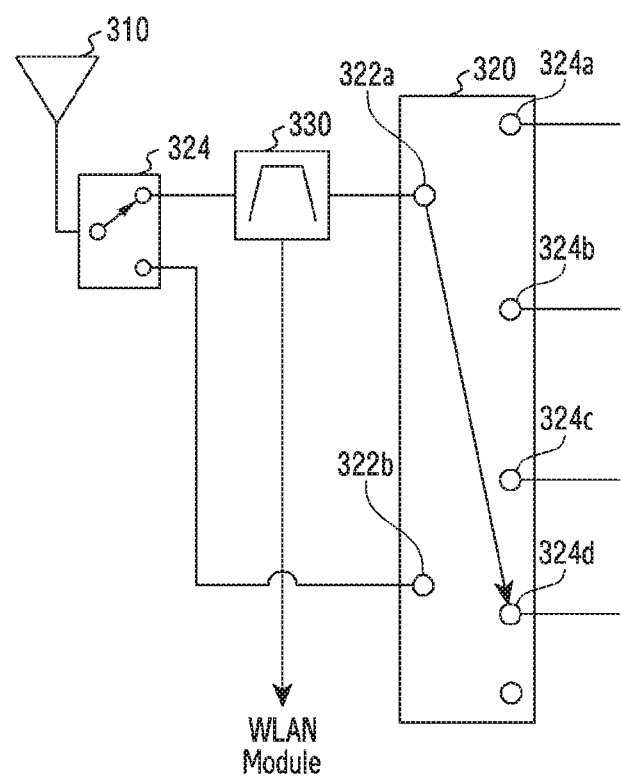
FIG. 3C illustrates a coupling structure of an antenna and a frequency separating circuit in an electronic device according to another embodiment.

FIG. 3C illustrates a coupling structure of the antenna 310 and the frequency separating circuit 330 in an electronic device according to a third embodiment. In FIG. 3C, a bypass using one switch 324, which is less than the number of switches of FIG. 3B, may be formed. When a communication using the second RAT is performed, a signal having passed through the switch 324 and the frequency separating circuit 330 may be input to a first input terminal 322a of the switch 320, and when a communication using the second RAT is not performed, a signal having passed through the switch 324 may be input to a second input terminal 322b of the switch 320. A bypass used when a communication using the second RAT is not performed does not include the frequency separating circuit 330, but may include the switch 324. Even if a bypass is used, as shown in FIG. 3B, a signal loss due to the switch 324 may still occur.

In FIGS. 3A, 3B, and 3C, the switch 320 may be an SPNT switch or an XPNT switch. The switch 320 may include one input terminal 322 and a plurality of output terminals 324a, 324b, 324c and 324d. The frequency separating circuit 330 separates a signal received through the antenna 310 into a first RAT signal belonging to a band of a first RAT, such as LTE, LTE-A, or 5G NR, and/or a second RAT signal belonging to a band of a second RAT, such as WLAN. In addition, the frequency separating circuit 330 may output, through the switch 320, a first RAT signal to a component of processing a first RAT signal, and output a second RAT signal to a WLAN module of processing a second RAT signal.

The plurality of output terminals 324a to 324d may be coupled with RF paths corresponding to a plurality of bands used for the first RAT, respectively. Each of the RF paths may include at least one matching element, filter, or low noise amplifier (LNA).

In FIGS. 3A, 3B, and 3C, the loss of the first RAT signal may occur regardless of whether a communication using the second RAT is performed, by the frequency separating circuit 330 and/or at least one switch 322a, 322b, and/or 324 for a bypass. The following describes a structure for reducing the signal loss when a communication using the second RAT is not performed.

Figure 4:
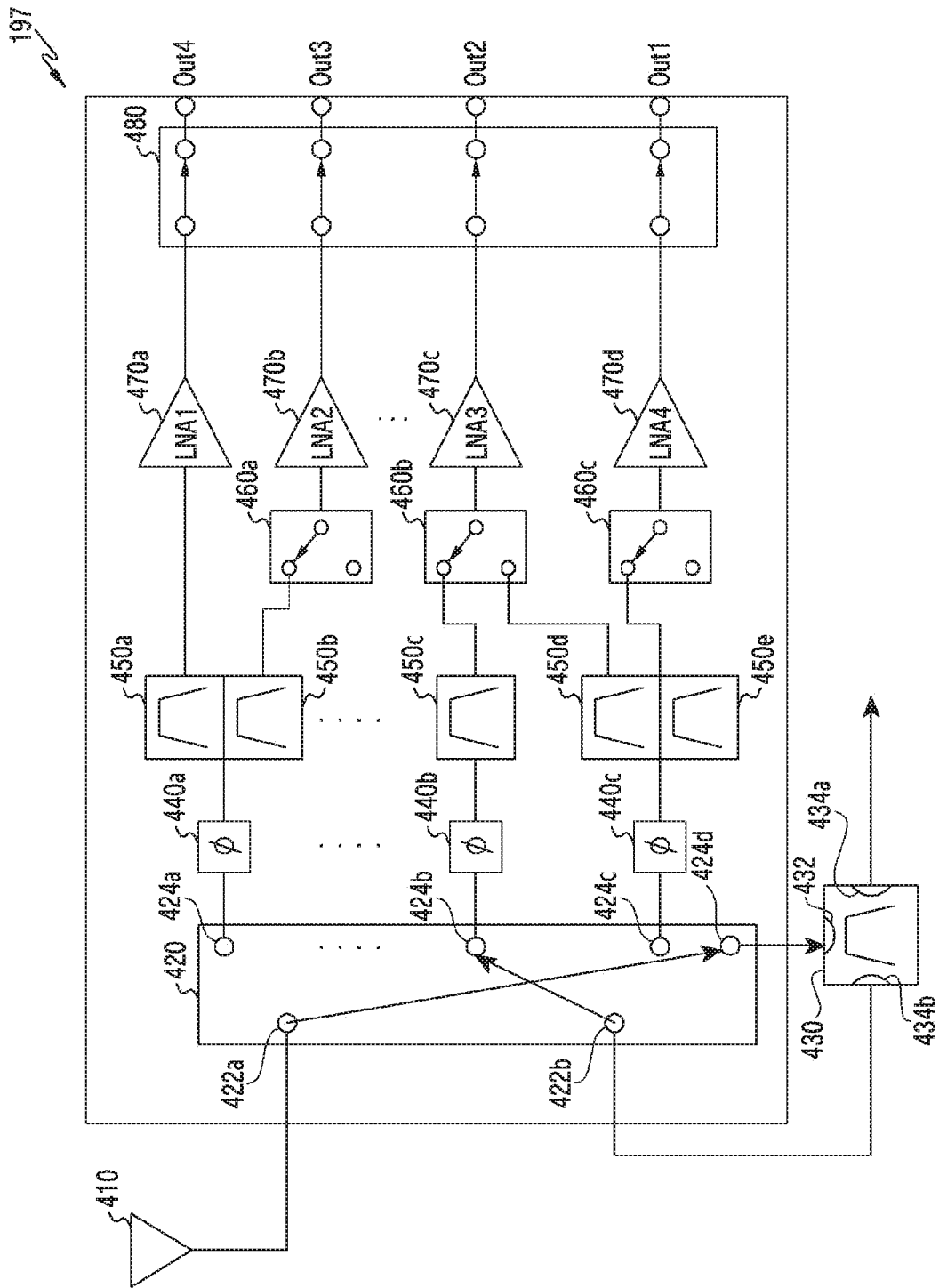
FIG. 4 is a block diagram of an antenna module including an antenna which is shared by a plurality of RATs in an electronic device according to an embodiment.

FIG. 4 is a block diagram of the antenna module 197 including an antenna which is shared by a plurality of RATs in an electronic device according to an embodiment.

Referring to FIG. 4, the antenna module 197 may include an antenna 410, a switch 420, a frequency separating circuit 430, matching elements 440a to 440c, filters 450a to 450e, filter switches 460a to 460c, LNAs 470a to 470d, and an output switch 480.

The antenna 410 may be designed to support a plurality of bands, including bands passing through the filters 450a to 450e and/or a band of a signal extracted by the frequency separating circuit 430.

The switch 420 may include a plurality of input terminals 422a and 422b and/or a plurality of output terminals 424a to 424d. Each of the plurality of input terminals 422a and 422b may be controlled to be connected to at least one of the plurality of output terminals 424a to 424d. An input terminal 422a of the plurality of input terminals 422a and 422b may be connected to the antenna 410.

The frequency separating circuit 430 may separate a signal received through the antenna 410 into a first RAT signal and a second RAT signal. The frequency separating circuit 430 may separate an input signal into a second RAT signal and at least one first RAT signal, and may output the second RAT signal and the at least one first RAT signal through different output terminals. For example, the frequency separating circuit 430 may extract a second RAT signal and at least one first RAT signal from a signal input through an input terminal 432, output the second RAT signal through a first output terminal 434a, and output the at least one first RAT signal through a second output terminal 434b.

The matching elements 440a to 440c are components for the impedance matching of the filters 450a to 450e. The matching elements 440a to 440c may be arranged between the output terminals 424a to 424c of the switch 420 and the filters 450a to 450e, and may include at least one passive element and/or at least one active element for adjusting the impedance. The impedance of the filters 450a to 450e may be adjusted by the matching elements 440a to 440c, thereby reducing the interference between the filters 450a to 450e.

The filters 450a to 450e may perform band pass filtering for each of bands used for a first RAT. For example, a first filter set may be implemented as a dual filter including a first filter 450a and a second filter 450b. The first filter 450a may allow a signal of a first band among signals provided through a first output terminal 424a to pass therethrough. The second filter 450b may allow a signal of a second band among the signals provided through the first output terminal 424a to pass therethrough. A second filter set, namely a third filter 450c, may allow a signal of a third band among signals provided through a second output terminal 424b to pass therethrough. A third filter set is a dual filter, and may include a fourth filter 450d and a fifth filter 450e. The fourth filter 450d may allow a signal of a fourth band among signals provided through a third output terminal 424c to pass therethrough. The fifth filter 450e may allow a signal of a fifth band among signals provided through the third output terminal 424c to pass therethrough. In FIG. 4, the first filter set 450a and 450b, and the third filter set 450d and 450e are described as dual filters, each having two outputs. In another embodiment, at least one of the first filter set 450a and 450b and the third filter set 450d and 450e may be configured by a plurality of filters, each having at least one output.

The filter switches 460a to 460c may control paths between at least some of the filters 450a to 450e and at least some of the LNAs 470a to 470d. For example, a first filter switch 460a may be controlled to connect the second filter 450b to a second LNA 470b, a second filter switch 460b may be controlled to connect one of the third filter 450c or the fourth filter 450d to a third LNA 470c, and a third filter switch 460c may be controlled to connect the fifth filter 450e to a fourth LNA 470d.

The LNAs 470a to 470d may amplify the signals having been filtered by the filters 450a to 450e. Each of the LNAs 470a to 470d may be designed to amplify a signal of a corresponding band. For example, the first LNA 470a may be designed to amplify a signal of band B25, the second LNA 470b may be designed to amplify a signal of band B66, the third LNA 470c may be designed to amplify a signal of band B7 or band B41, and the fourth LNA 470d may be designed to amplify a signal of band B30.

The output switch 480 may connect each of the LNAs 470a to 470d to at least one of output terminals. The output switch 480 may be used to select an output terminal which is to output a signal having been amplified by at least one of the LNAs 470a to 470d. For example, when reception signals are processed by a plurality of transceivers or at least one transceiver capable of processing a plurality of inputs, such as when a CA operation is performed, the output switch 480 may form a path which enables outputs of two or more LNAs among the LNAs 470a to 470d to be provided to the plurality of transceivers. The output switch 480 may be omitted, or may be configured to have a different number of output terminals from the example of FIG. 4.

As illustrated in FIG. 4, the loss of the first RAT signal may be reduced by a connection structure of the switch 420 and the frequency separating circuit 430.

Figure 5A:
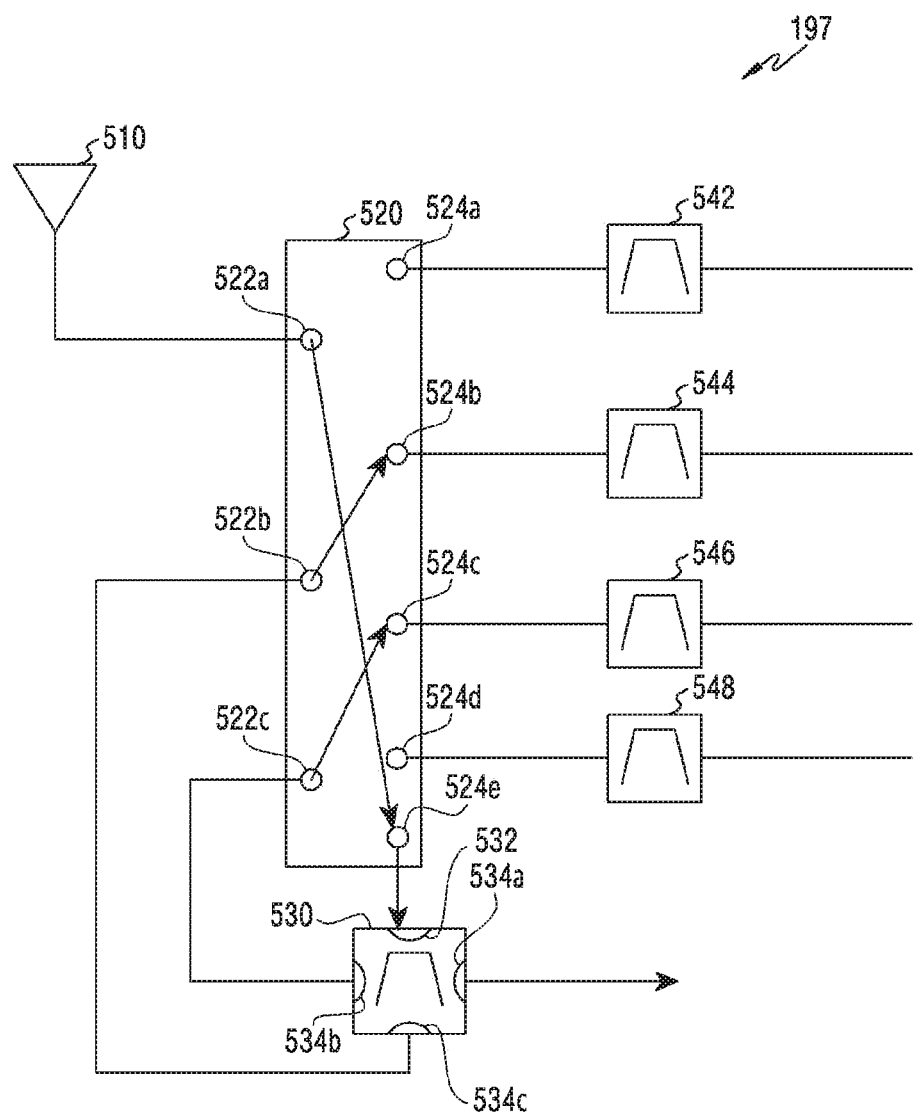
FIG. 5A is a block diagram of an antenna module including an antenna which is shared by a plurality of RATs in an electronic device according to another embodiment.

FIG. 5A is a block diagram of the antenna module 197 including an antenna which is shared by a plurality of RATs in an electronic device according to a second embodiment.

Referring to FIG. 5A, the antenna module 197 may include an antenna 510, a switch 520, a frequency separating circuit 530, and/or filters 542, 544, 546, and 548.

The antenna 510, the switch 520, the frequency separating circuit 530, and/or the filters 542, 544, 546, and 548 may correspond to the antenna 410, the switch 420, the frequency separating circuit 430, and/or the filters 450a to 450e of FIG. 4.

According to a coupling structure of the switch 520 and the frequency separating circuit 530, which is illustrated in FIG. 5A, an input terminal 532 of the frequency separating circuit 530 may be coupled with a fifth output terminal 524e which is one of output terminals 524a to 524e of the switch 520. When the input terminal 532 of the frequency separating circuit 530 is coupled with one of the output terminals 524a to 524e of the switch 520, and a signal separating operation of the frequency separating circuit 530 is thus required, a first input terminal 522a connected to the antenna 510 may be connected to the fifth output terminal 524e in the switch 520.

When the signal separating operation of the frequency separating circuit 530 is not required such as when a communication using a second RAT is not performed, the first input terminal 522a coupled with the antenna 510 in the switch 520 may be connected to at least one of other output terminals 524a to 524d, not the fifth output terminal 524e. As the first input terminal 522a is connected to at least one of the output terminals 524a to 524d, a signal may be provided to at least one of the filters 542, 544, 546, and 548 without passing through the frequency separating circuit 530.

In FIG. 5A, first RAT signals may be output from a second output terminal 534b and/or a third output terminal 534c. The first RAT signals output from the second output terminal 534b and the third output terminal 534c may be signals belonging to different bands. Alternatively, one first RAT signal may be output from one output terminal among the second output terminal 534b and the third output terminal 534c. In this case, one of a wire between the second output terminal 534b and a second input terminal 522b and a wire between the third output terminal 534c and a third input terminal 522c may be omitted.

Figure 5B:
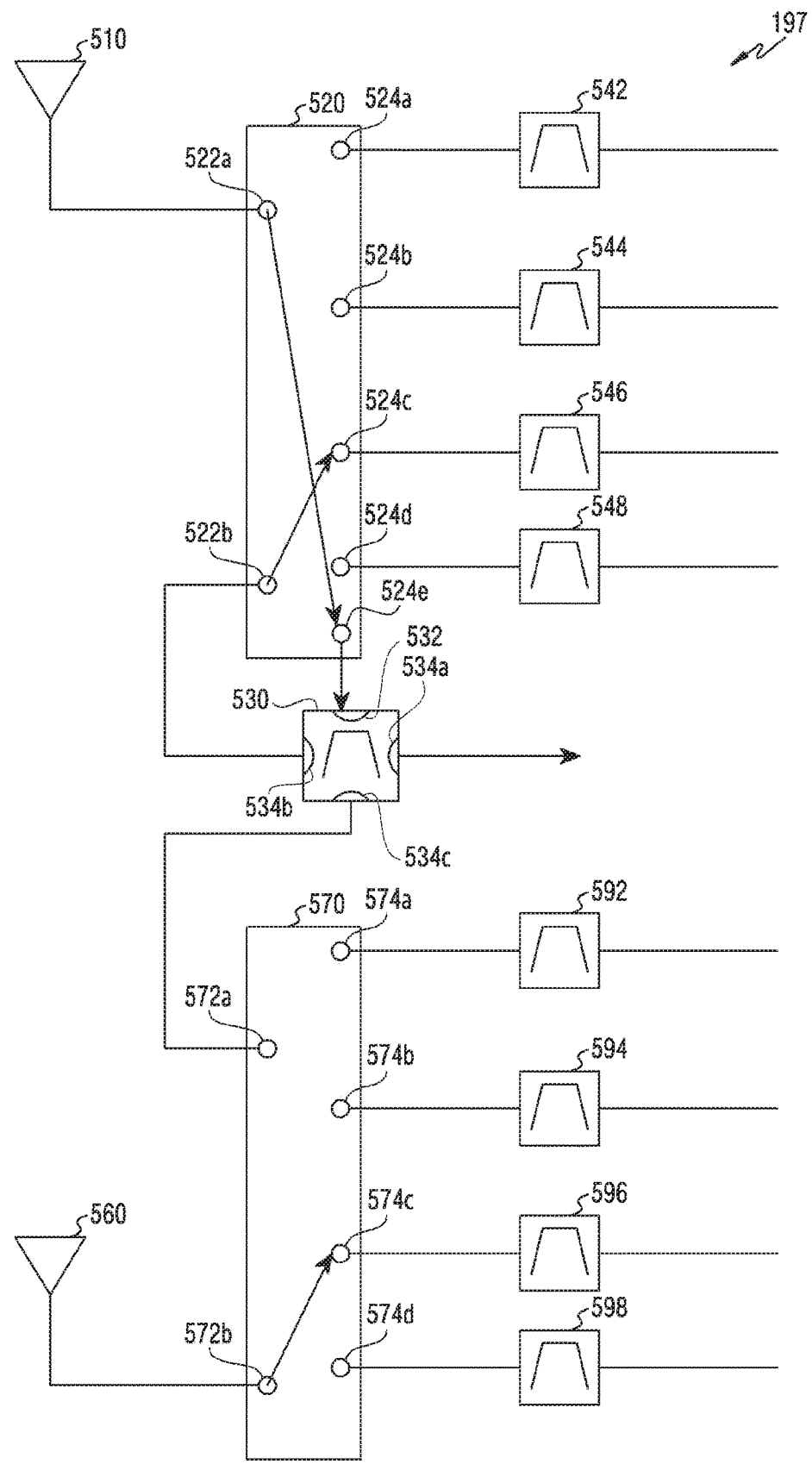
FIG. 5B is a block diagram of an antenna module including an antenna which is shared by a plurality of RATs in an electronic device according to another embodiment.

FIG. 5B is a block diagram of an antenna module including an antenna which is shared by a plurality of RATs in an electronic device according to a third embodiment.

Referring to FIG. 5B, the antenna module 197 may include a first antenna 510, a first switch 520, a frequency separating circuit 530, filters 542, 544, 546, and 548, a second antenna 560, a second switch 570, and/or filters 592, 594, 596, and 598.

The first antenna 510 and the second antenna 560 may be designed to support different bands, such as a middle band (MB) and a high band (HB), and the second antenna 560 may be designed to support a low band (LB). For example, the LB and the MB may be divided with reference to 1 gigahertz (GHz), and the MB and the HB may be divided with reference to 2.3 GHz.

The first switch 520 and the second switch 570 are XPNT switches having a similar structure, and each of the switches may be coupled with a corresponding antenna 510 or 560 through one input port 522a or 572a. Some of output terminals 524a to 524e of the first switch 520 may be coupled with the filters 542, 544, 546, and 548, and output terminals 574a to 574d of the second switch 570 may be coupled with the filters 592, 594, 596, and 598.

The frequency separating circuit 530 may be coupled with the first switch 520 and the second switch 570. An input terminal 532 of the frequency separating circuit 530 may be coupled with a fifth output terminal 524e of the first switch 520, and a third output terminal 534c of the frequency separating circuit 530 may be coupled with a first input terminal 572a of the second switch 570. A first output terminal 534a of the frequency separating circuit 530 may be coupled with a component (for example, a WLAN module) of processing a second RAT signal, and a second output terminal 534b of the frequency separating circuit 530 may be coupled with a second input terminal 522b of the first switch 520.

According to a coupling structure of FIG. 5B, the first switch 520 and the second switch 570 may be coupled to each other through the frequency separating circuit 530, and the first antenna 510 and the second antenna 560 may be coupled to the first switch 520 and the second switch 570 which are coupled to each other, respectively. As the frequency separating circuit 530 is coupled with the second switch 570, a signal received through the first antenna 510 may be provided to at least one of RF paths coupled to the second switch 570 by passing through the first switch 520, the frequency separating circuit 530, and the second switch 570.

When the performance deterioration of the second antenna 560 may occur due to a surrounding environment condition (for example, shielding due to a hand grip), the coupling structure of FIG. 5B enables a signal to be provided to RF paths coupled to the second switch 570 through the first antenna 510. When the second antenna 560 is designed to support the LB, and the first antenna 510 is designed to support the MB and the HB, the reception of an LB signal through the first antenna 510 may not ensure a higher performance than the reception of an LB signal through the second antenna 560. In regard to the LB signal reception, even if the first antenna 510 provides a lower performance than the second antenna 560, if the second antenna 560 is shielded by the hand grip, the reception of an LB signal through the first antenna 510 may provide a higher performance.

The coupling structure of FIG. 5B may be used for multiple input/multiple output (MIMO) reception. For example, a first signal received through the first antenna 510 may be input to the first input terminal 572a of the second switch 570 through the first switch 520 and the frequency separating circuit 530, and may be output through one of the output terminals 524a to 524d. A second signal received through the second antenna 560 may be input to a second input terminal 572b of the second switch 570, and may be output through one of the output terminals 574a to 574d. Since two signals are received through different antennas 510 and 560, provided to different RF paths, and thus propagate through channels having relatively low correlation, the two signals may be used to detect MIMO.

While FIG. 5B illustrates when two switches 520 and 570 are coupled to each other by one frequency separating circuit 530, three or more switches may be successively coupled to each other through two or more frequency separating circuits.

As described above, a connection state between terminals inside a switch may vary depending on whether a communication using a second RAT (for example, the connectivity)

is performed. Even if an output terminal through which a first RAT signal is output is the same, a connection state inside a switch may vary depending on whether a communication using a second RAT (for example, the connectivity) is performed. It is considered whether a communication using a second RAT (for example, the connectivity) is performed, and the control of a connection state of a switch (for example, the switch 420) coupled with a frequency separating circuit may be based on whether a first RAT is activated and whether a second RAT is activated. A first CP for performing a communication using a first RAT and a second communication module (for example, a WLAN module) for performing a communication using a second RAT may not know each other's operation states, and thus, a control operation based on a coupling structure of FIG. 6 may be required.

Figure 6:
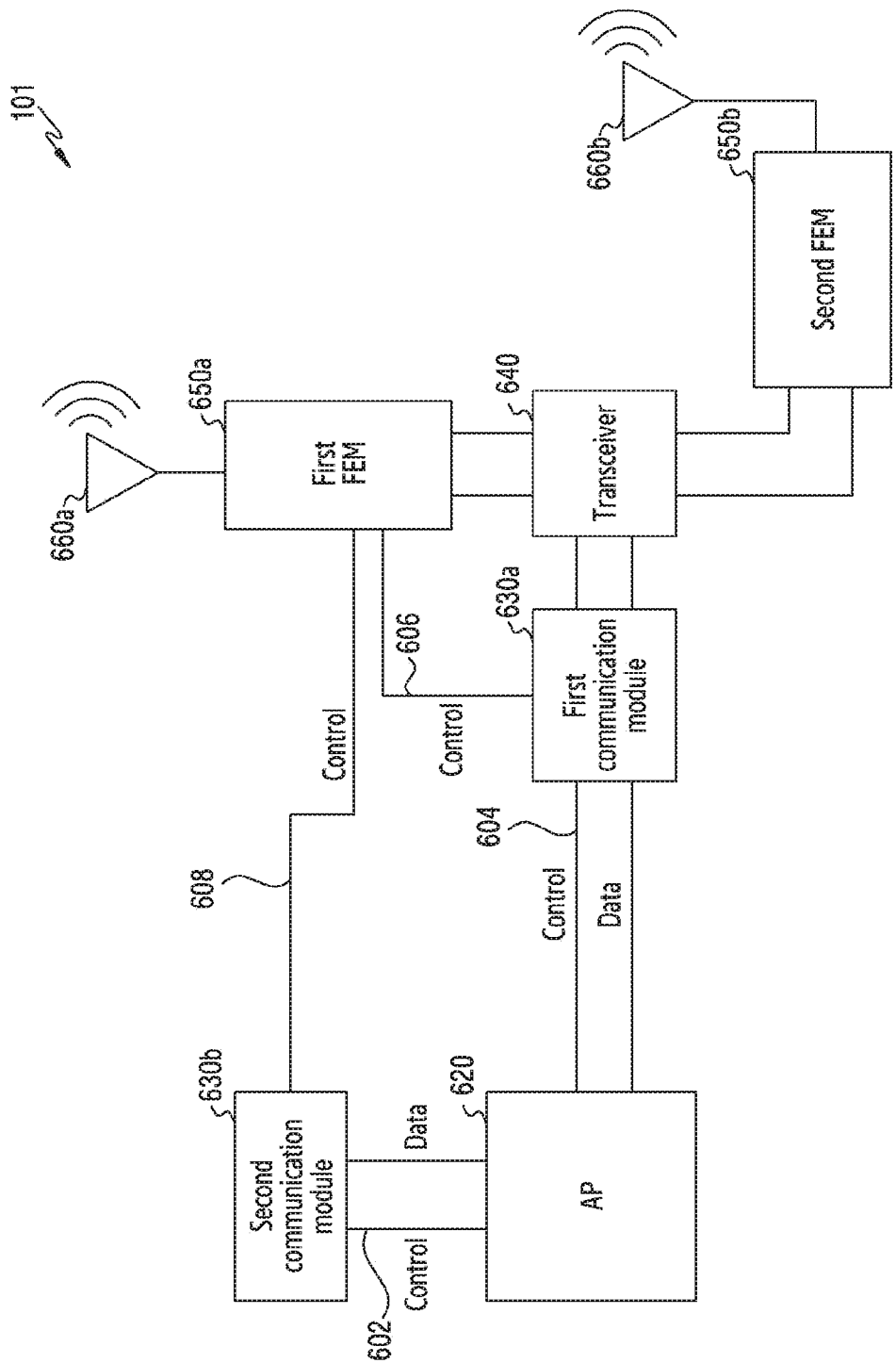
FIG. 6 illustrates a coupling structure for controlling an RF FEM, based on operation states of a plurality of RATs in an electronic device according to an embodiment.

FIG. 6 illustrates a coupling structure for controlling an RF FEM, based on operation states of a plurality of RATs in an electronic device according to an embodiment.

Referring to FIG. 6, the electronic device 101 may include an AP 620, a first communication module 630*a*, a second communication module 630*b*, a transceiver 640, a first FEM 650*a*, a second FEM 650*b*, a first antenna 660*a*, and/or a second antenna 660*b*.

The AP 620 is a component corresponding to the processor 120 of FIG. 1, and may control operations of the first communication module 630*a* and/or the second communication module 630*b*. The first communication module 630*a* is a circuit for processing a signal of a first RAT, and may generate and/or interpret a signal in accordance with a standard of the first RAT. The second communication module 630*b* is a circuit for processing a signal of a second RAT, and may generate and/or interpret a signal in accordance with a standard of the second RAT. The transceiver 640 may perform RF processing for transmitting and/or receiving a signal of the first RAT. The first communication module 630*a* and/or the transceiver 640 processes a signal of the first RAT, and may be referred to as "a first signal processing module", and the second communication module 630*b* processes a signal of the second RAT, and may be referred to as "a second signal processing module". The first FEM 650*a* may be coupled with the first antenna 660*a*, and the second communication module 630*b* or the transceiver 640, and may include at least one switch, at least one filter, and/or at least one amplifier. The second FEM 650*b* may be coupled with the second antenna 660*b* and the transceiver 640, and may include at least one switch, at least one filter, and/or at least one amplifier.

The first FEM 650*a* may include the switch 520 and/or the frequency separating circuit 530 of FIG. 5A. The first FEM 650*a* and the second FEM 650*b* may include the first switch 520, the frequency separating circuit 530, and/or the second switch 570 of FIG. 5B. A switch, such as switch 520, included in the first FEM 650*a* may be controlled based on an operation state of the first communication module 630*a* and an operation state of the second communication module 630*b*. In order to control the switch included in the first FEM 650*a*, based on the operation state of the first communication module 630*a* and the operation state of the second communication module 630*b*, one of embodiments below will be selected.

The first communication module 630*a* may control the first FEM 650*a*, based on the control of the AP 620. For example, the AP 620 identifies the operation state of the second communication module 630*b* through a control line 602, and may then transfer a control command for the first FEM 650*a* to the first communication module 630*a* through a control line 604. Upon identifying the control command, the first communication module 630*a* may apply a control signal to the first FEM 650*a* through a control line 606. The control command may include information indicating the operation state of the second communication module 630*b*, or may include information indicating a connection state of the switch of the first FEM 650*a*, which has been determined based on the operation states of the first communication module 630*a* and the second communication module 630*b*.

The second communication module 630*b* may control the first FEM 650*a*, based on the control of the AP 620. The AP 620 identifies the operation state of the first communication module 630*a* through the control line 604, and may then transfer a control command for the first FEM 650*a* to the second communication module 630*b* through the control line 602. Upon identifying the control command, the first communication module 630*a* may apply a control signal to the first FEM 650*a* through a control line 608. For example, the control command may include information indicating the operation state of the first communication module 630*a*, or may include information indicating a connection state of the switch of the first FEM 650*a*, which has been determined based on the operation states of the first communication module 630*a* and the second communication module 630*b*.

The first communication module 630*a* and the second communication module 630*b* may independently control the first FEM 650*a*. The first communication module 630*a* and the second communication module 630*b* may have the authority for controlling a connection state of the switch of the first FEM 650*a* within a defined range. The first FEM 650*a* may support a function corresponding to the independent control performed by each of the first communication module 630*a* and the second communication module 630*b*. For example, the first FEM 650*a* may support a function of controlling a connection state of a switch, based on a combination result of the control signal from the first communication module 630*a* and the control signal from the second communication module 630*b*.

Figure 7:
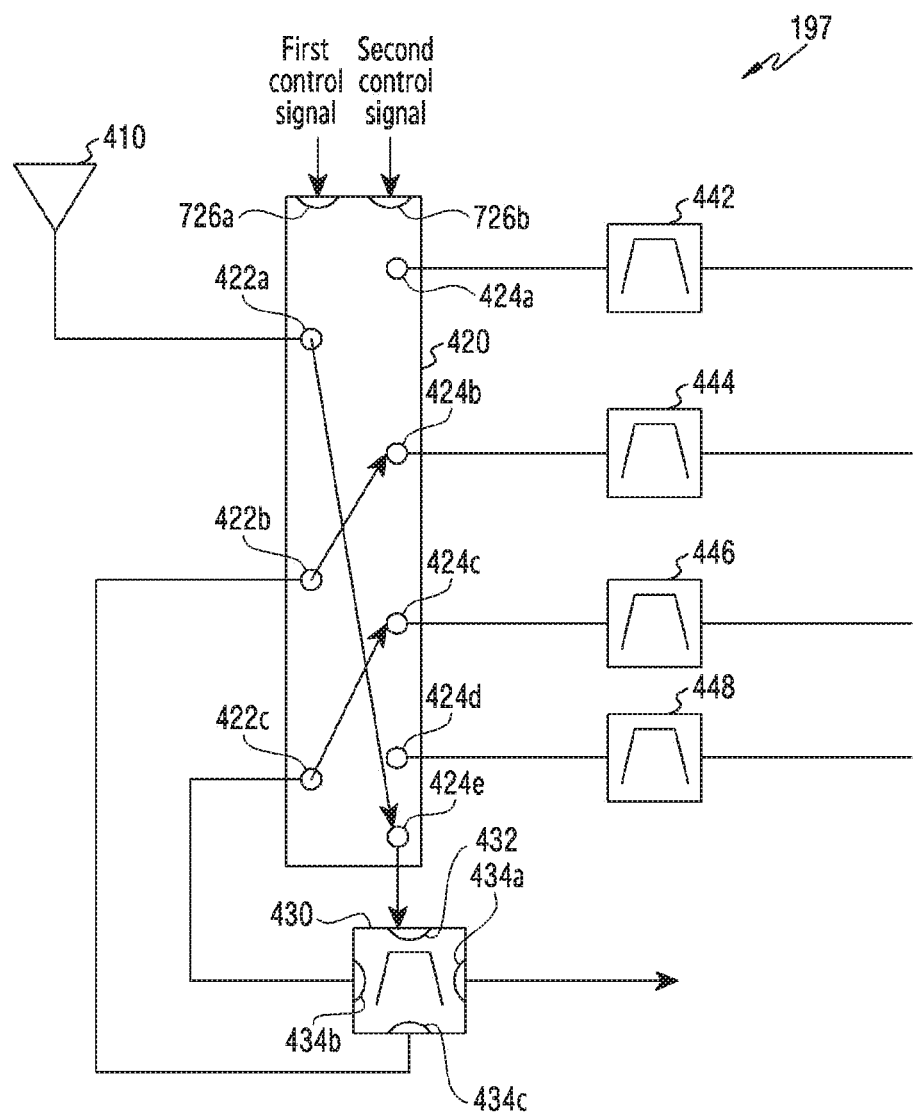
FIG. 7 is a block diagram of an antenna module for controlling a connection state of a switch in accordance with the control of a plurality of communication modules in an electronic device according to an embodiment.

FIG. 7 is a block diagram of the antenna module 197 for controlling a connection state of a switch 520 in accordance with the control of a plurality of communication modules in an electronic device according to an embodiment.

Referring to FIG. 7, the switch 420 may include a first control terminal 726*a* and/or a second control terminal 726*b*. The first control terminal 726*a* may be used to receive a first control signal from the first communication module 630*a*, and the second control terminal 726*b* may be used to receive a second control signal from the second communication module 630*b*.

The first control signal from the first communication module 630*a* may be used to determine a terminal to be used so as to output a signal, among the output terminals 424*a* to 424*d* of the switch 420. For example, when the first control signal indicates a band B, a connection state may be controlled to enable a signal to be output from the second output terminal 424*b* to a filter 444. The second control signal from the second communication module 630*b* may be used to determine a path between the first input terminal 422*a* coupled with the antenna 410 and an output terminal selected by the first control signal. An output terminal of the switch 420 through which a signal is output is not changed by a value of the second control signal, but a path through which a signal is transferred from the first input terminal 422*a* to an output terminal may be changed by a value of the second control signal.

For example, two mapping rules may be defined, i.e., the rules corresponding to values of the first control signal and relating to connection states between terminals of the switch 420. One mapping rule among the two mapping rules may be selectively applied by a value of the second control signal. The first control signal may be defined based on an mobile industry processor interface (MIPI), and the second control signal may be defined based on a general purpose input/output (GPIO) interface. As a GPIO signal is involved in an MIPI table to which the first control signal refers, the referred MIPI table may be changed by a value of the GPIO signal. For example, when the GPIO signal is "0", an MIPI map corresponding to a register address "0" may be used to determine a connection state of the switch 420, and when the GPIO signal is "1", an MIPI map corresponding to a register address "1" may be used to determine a connection state of the switch 420.

According to an embodiment, an electronic device may include an antenna, an RF FEM connected to the antenna, a first signal processing module connected to the RF FEM and processing a signal of a first RAT, and a second signal processing module connected to the RF FEM and processing a signal of a second RAT, and the RF FEM may include a frequency separating circuit for separating a signal received through the antenna into a signal of the first RAT and a signal of the second RAT, and a switch including a first input terminal coupled with the antenna, a first output terminal coupled with an input terminal of the frequency separating circuit, a second input terminal coupled with one of output terminals of the frequency separating circuit, and a second output terminal coupled with a path for the first communication module.

When the first RAT and the second RAT are activated, the switch may be controlled to connect the first input terminal to the first output terminal, and to connect the second input terminal to the second output terminal.

When the second RAT is deactivated, the switch may be controlled to connect the first input terminal to the second output terminal.

Another one of the output terminals of the frequency separating circuit may be coupled with the second signal processing module.

Another one of the output terminals of the frequency separating circuit may be coupled with a third input terminal of the switch.

Another one of the output terminals of the frequency separating circuit may be coupled with an input terminal of another switch.

The switch may be controlled to provide an input terminal of the another switch with a first signal received through the antenna through the frequency separating circuit, and the another switch may be controlled to output the first signal provided through the input terminal through a first output terminal.

The another switch may be controlled to output a second signal received through another antenna coupled to the another switch to a path connected to a second output terminal of the another switch.

The disclosure further includes a processor for controlling operations of the first signal processing module and the second signal processing module, and a connection state between terminals of the switch may be controlled by a control signal which is generated by the first communication module, based on a control command of the processor, or a control signal which is generated by the second communication module, based on a control command of the processor.

A connection state between terminals of the switch may be controlled by a first control signal which is generated by the first signal processing module and a second control signal which is generated by the second signal processing module.

The first control signal may be used to determine an output terminal through which a signal received through the antenna or a signal separated by the frequency separating circuit is output, and the second control signal may be used to determine a path between the first input terminal coupled with the antenna and the output terminal determined based on the first control signal.

The first control signal may be a signal based on an MIPI, and the second control signal may be a signal based on a GPIO interface.

The second control signal may designate one of mapping rules which correspond to values of the first control signal and define connection states between terminals of the switch.

The first RAT may be a cellular communication technology, and the second RAT may be a WLAN communication technology.

Figure 8:
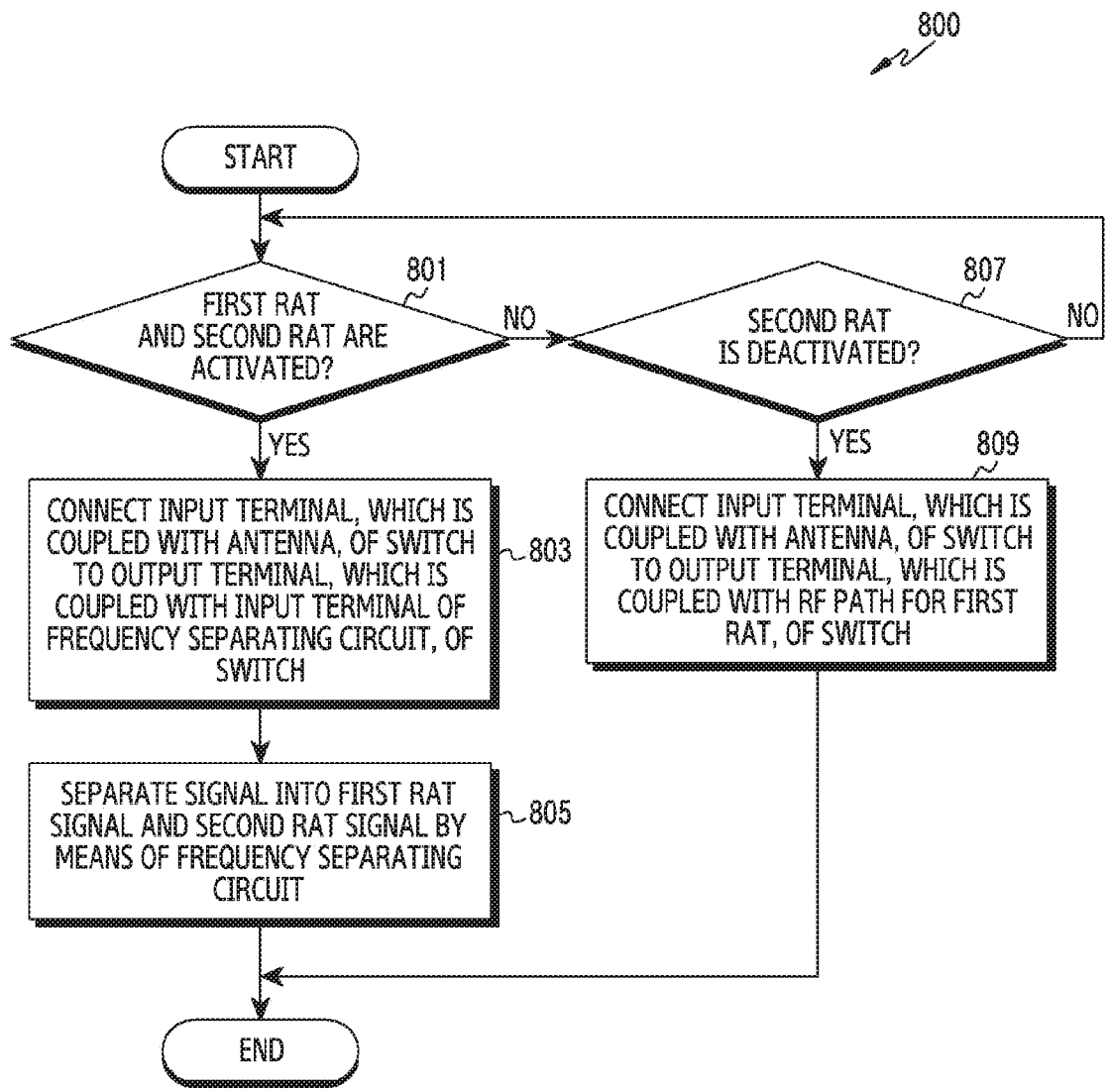
FIG. 8 is a flowchart for controlling a frequency separating circuit in an electronic device according to an embodiment.

FIG. 8 is a flowchart 800 for controlling a frequency separating circuit in an electronic device according to an embodiment. It may be understood that an operation subject of the flowchart 800 illustrated in FIG. 8 indicates the electronic device 101 or a component of the electronic device 101.

Referring to FIG. 8, in step 801, the electronic device 101 may identify whether a first RAT and a second RAT are activated. For example, the electronic device 101 may identify whether a first communication module and a second communication module operate in a connected state. The electronic device 101 may identify whether a second RAT signal is required to be extracted from a signal received through an antenna.

If the first RAT and the second RAT are activated, in step 803, the electronic device 101 may connect an input terminal, which is coupled with an antenna, of a switch to an output terminal, which is coupled with an input terminal of a frequency separating circuit, of the switch. The electronic device 101 may control a connection state of the switch to enable a signal received through the antenna to be input to the frequency separating circuit through the switch.

In step 805, the electronic device 101 may separate a signal into a first RAT signal and a second RAT signal by means of the frequency separating circuit. The first RAT signal having been separated by the frequency separating circuit may be input to another input terminal of the switch, and may be provided to at least one of RF paths for the first RAT through at least one of output terminals. The second RAT signal having been separated by the frequency separating circuit may be provided to a second communication module.

If, in step 801, at least one of the first RAT and the second RAT is not activated, in step 807, the electronic device 101 may determine whether the second RAT is deactivated. For example, the electronic device 101 may determine whether the second communication module operates in a connected state.

If the second RAT is deactivated, in step 809, the electronic device 101 may connect an input terminal, which is coupled with the antenna, of the switch to an output terminal, which is coupled with an RF path for the first RAT, of the switch. The electronic device 101 may control a connection state of the switch to enable a signal received through the antenna to be provided to at least one of RF paths through the switch without passing through the frequency separating circuit.

In FIG. 8, step 801 and/or step 807 may be an action of determining a condition depending on whether the first RAT and the second RAT are activated. Step 801 and/or step 807 are described as an action to be identified by the electronic device 101, but following actions performed by the determination of step 801 and/or step 807 may not be performed directly by the determination of the processor 120 or the AP 620. For example, in FIG. 7, when a connection state of the switch is controlled according to the control of each of the first communication module and the second communication module, the following actions may be performed according to the control of each of the first communication module and the second communication module, not the determination of the processor 120 or the AP 620. Step 801 and/or step 807 are not determined by the processor 120 or the AP 620, but rather, may be understood as defining a situation that satisfies a corresponding condition.

Figure 9:
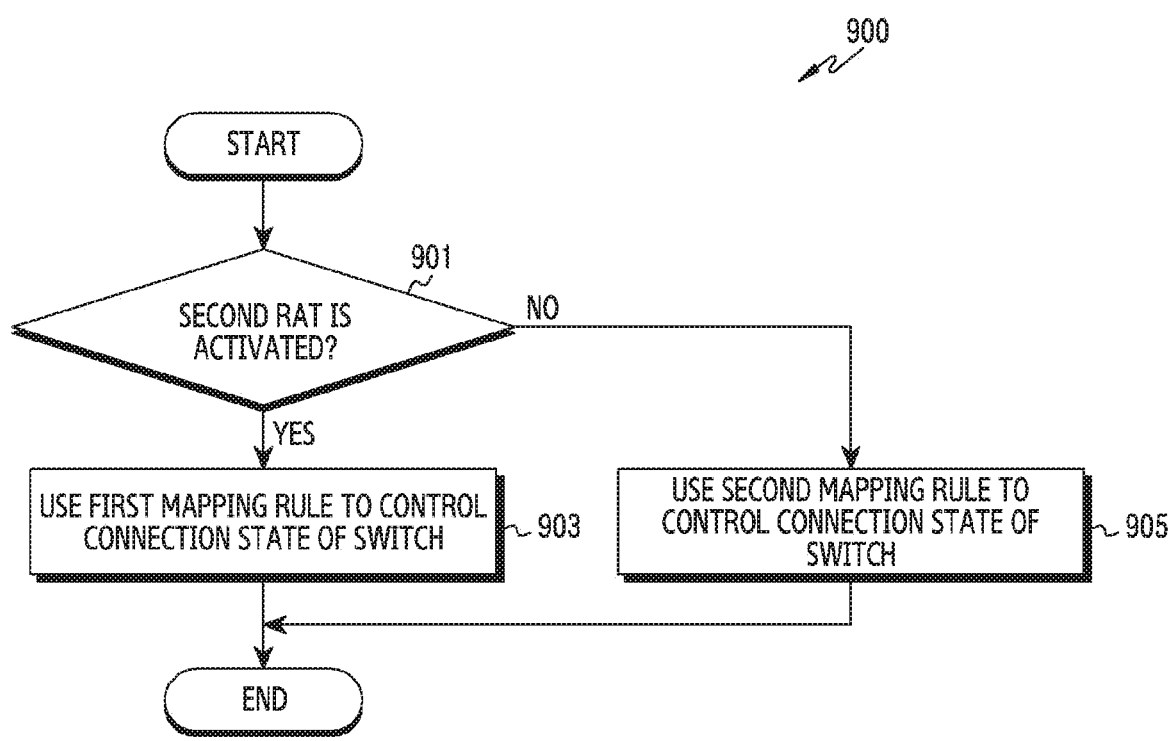
FIG. 9 is a flowchart for controlling a switch coupled with a frequency separating circuit in an electronic device according to an embodiment.

FIG. 9 is a flowchart 900 for controlling a switch coupled with a frequency separating circuit in an electronic device according to an embodiment. It may be understood that an operation subject of the flowchart 900 illustrated in FIG. 9 indicates the electronic device 101 or a component of the electronic device 101.

Referring to FIG. 9, in step 901, the electronic device 101 may determine whether a second RAT is activated. For example, the electronic device 101 may determine that a second communication module operates in a connected state. The electronic device 101 may determine whether a second RAT signal is required to be extracted from a signal received through an antenna.

If the second RAT is activated, in step 903, the electronic device 101 may perform control such that a first mapping rule is used so as to control a connection state of a switch. For example, the second communication module 630b may apply, to the switch, a control signal representing the first mapping rule. If the second RAT is deactivated, in step 905, the electronic device 101 may perform control such that a second mapping rule is used so as to control a connection state of the switch. For example, the second communication module 630b may apply, to the switch, a control signal representing the second mapping rule. The control signal representing the first mapping rule or the second mapping rule may be a GPIO signal.

According to an embodiment, an operation method of an electronic device may include connecting a first input terminal, which is coupled with an antenna, of a switch to a first output terminal, which is coupled with an input terminal of a frequency separating circuit, of the switch when a first RAT and a second RAT are activated, providing an RF path coupled with a first signal processing module for the first RAT with a first RAT signal separated, by the frequency separating circuit, from a signal received through the antenna, through a second input terminal and a second output terminal of the switch, and providing a second signal processing module for the second RAT with a second RAT signal separated, by the frequency separating circuit, from a signal received through the antenna.

The method may further include connecting the first input terminal the second output terminal when the second RAT is deactivated.

The method may further include providing an input terminal of another switch with the first RAT signal separated, by the frequency separating circuit, from a signal received through the antenna.

A connection state between terminals of the switch may be controlled by a first control signal generated by the first signal processing module and a second control signal generated by the second signal processing module.

The first control signal may be used to determine an output terminal through which a signal received through the antenna or a signal separated by the frequency separating circuit is output, and the second control signal may be used to determine a path between the first input terminal coupled with the antenna and the output terminal determined based on the first control signal.

The first control signal may be a signal based on an MIPI, and the second control signal may be a signal based on a GPIO interface.

As a method and an electronic device herein perform control to enable a frequency separating circuit coupled to a single antenna supporting multiple bands to be selectively included on a reception path, signal loss due to the frequency separating circuit is reduced.

As used herein, the term "module" may include a unit implemented in hardware, software, or firmware, and may interchangeably be used with other terms, such as "logic," "logic block," "part," or "circuitry". A module may be a single integral component, or a minimum unit or part thereof, adapted to perform one or more functions. For example, the module may be implemented in a form of an application-specific integrated circuit (ASIC).

Embodiments as set forth herein may be implemented as software including one or more instructions that are stored in a storage medium that is readable by a machine. For example, a processor of the machine may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" indicates that the storage medium is a tangible device, and does not include a signal, but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component of the above-described components may include a single entity or multiple entities. One or more of the above-described components may be omitted, or one or more other components may be added. Alternatively or additionally, a plurality of components may be integrated into a single component. In such a case, the integrated component may still perform one or more functions of each of the plurality of components in the same or similar manner as they are performed by a corresponding one of the plurality of components before the integration. Operations performed by the module, the program, or another component may be performed sequentially, in parallel, repeatedly, or heuristically, or one or more of the operations may be executed in a different order or omitted, or one or more other operations may be added.

While the disclosure has been particularly shown and described with reference to embodiments thereof, it will be understood by those skilled in the art that various changes in form and details may be made therein without departing from the scope of the subject matter as defined by the appended claims and their equivalents.

What is claimed is:

1. An electronic device comprising:
an antenna;
a radio frequency front end module (RF FEM) connected to the antenna;
a first signal processing module connected to the RF FEM and configured to process a signal of a first radio access technology (RAT); and
a second signal processing module connected to the RF FEM and configured to process a signal of a second RAT, the signal of the second RAT being different than the signal of the first RAT, and the RF FEM including a frequency separating circuit configured to separate a signal received through the antenna into the signal of the first RAT and the signal of the second RAT; and
a switch including a first input terminal coupled with the antenna, a first output terminal coupled with an input terminal of the frequency separating circuit, a second input terminal coupled with one of output terminals of the frequency separating circuit, and a second output terminal coupled with a path for the first signal processing module.

2. The electronic device of claim 1,
wherein, when the first RAT and the second RAT are activated, the switch is controlled to connect the first input terminal to the first output terminal, and to connect the second input terminal to the second output terminal.

3. The electronic device of claim 1,
wherein, when the second RAT is deactivated, the switch is controlled to connect the first input terminal to the second output terminal.

4. The electronic device of claim 1,
wherein another one of the output terminals of the frequency separating circuit is coupled with the second signal processing module.

5. The electronic device of claim 1,
wherein another one of the output terminals of the frequency separating circuit is coupled with a third input terminal of the switch.

6. The electronic device of claim 1,
wherein another one of the output terminals of the frequency separating circuit is coupled with an input terminal of another switch.

7. The electronic device of claim 6,
wherein the switch is controlled to provide the input terminal of the another switch with a first signal received through the antenna, through the frequency separating circuit, and
wherein the another switch is controlled to output the first signal provided through the input terminal, through the first output terminal.

8. The electronic device of claim 7,
wherein the another switch is controlled to output a second signal received through another antenna coupled to the another switch to a path connected to a second output terminal of the another switch.

9. The electronic device of claim 1, further comprising a processor configured to control operations of the first signal processing module and the second signal processing module,
wherein a connection state between terminals of the switch is controlled by a control signal which is generated by the first signal processing module or by the second signal processing module, based on a control command of the processor.

10. The electronic device of claim 1,
wherein a connection state between terminals of the switch is controlled by a first control signal generated by the first signal processing module and a second control signal generated by the second signal processing module.

11. The electronic device of claim 10,
wherein the first control signal is used to determine an output terminal through which a signal received through the antenna or a signal separated by the frequency separating circuit is output, and
wherein the second control signal is used to determine a path between the first input terminal coupled with the antenna and the output terminal determined based on the first control signal.

12. The electronic device of claim 10,
wherein the first control signal is based on a mobile industry processor interface (MIPI), and
wherein the second control signal is based on a general purpose input/output (GPIO) interface.

13. The electronic device of claim 10,
wherein the second control signal designates one of mapping rules which correspond to values of the first control signal and define connection states between terminals of the switch.

14. The electronic device of claim 1,
wherein the first RAT is a cellular communication technology, and
wherein the second RAT is a wireless local area network (WLAN) communication technology.

15. An operation method of an electronic device, comprising:
connecting a first input terminal, which is coupled with an antenna, of a switch to a first output terminal, which is coupled with an input terminal of a frequency separating circuit of the switch when a first radio access technology (RAT) and a second RAT are activated;
providing a radio frequency (RF) path coupled with a first signal processing module for the first RAT with a first RAT signal separated, by the frequency separating circuit, from a signal received through the antenna, through a second input terminal and a second output terminal of the switch; and
providing a second signal processing module for the second RAT with a second RAT signal separated, by the frequency separating circuit, from a signal received through the antenna.

16. The method of claim 15, further comprising connecting the first input terminal to the second output terminal when the second RAT is deactivated.

17. The method of claim 15, further comprising providing an input terminal of another switch with the first RAT signal separated, by the frequency separating circuit, from the signal received through the antenna.

18. The method of claim 15,
wherein a connection state between terminals of the switch is controlled by a first control signal generated by the first signal processing module and a second control signal generated by the second signal processing module.

19. The method of claim 18,
wherein the first control signal is used to determine an output terminal through which a signal received through the antenna or a signal separated by the frequency separating circuit is output, and
wherein the second control signal is used to determine a path between the first input terminal coupled with the antenna and the output terminal determined based on the first control signal.

20. The method of claim 18,
wherein the first control signal is a signal based on a mobile industry processor interface (MIPI), and
wherein the second control signal is a signal based on a general purpose input/output (GPIO) interface.

* * * * *